United States Patent [19]

Vanderwerf

[11] Patent Number: 4,741,613

[45] Date of Patent: May 3, 1988

[54] REDUCED HEIGHT TRANSMISSIVE OVERHEAD PROJECTOR

[75] Inventor: Dennis F. Vanderwerf, Cottage Grove, Minn.

[73] Assignee: Minnesota Mining and Manufacturing Company, St. Paul, Minn.

[21] Appl. No.: 944,425

[22] Filed: Dec. 19, 1986

[51] Int. Cl.[4] .............................................. G03B 21/14
[52] U.S. Cl. ................................ 353/38; 353/DIG. 3; 353/102
[58] Field of Search ............ 353/38, 102, 98, 97, 353/99, DIG. 3, DIG. 4, 85, 23, 24; 350/452

[56] References Cited

U.S. PATENT DOCUMENTS

| | | |
|---|---|---|
| 3,653,754 | 4/1972 | Yamanaka ............................ 353/61 |
| 3,702,395 | 11/1972 | Rosendahl ...................... 353/102 X |
| 3,770,344 | 11/1973 | Fukushima ........................... 353/38 |
| 3,915,568 | 10/1985 | Yamada et al. ...................... 353/99 |
| 4,080,052 | 3/1978 | Levin et al. ........................... 353/38 |
| 4,118,114 | 10/1978 | Anderson et al. .................... 353/38 |
| 4,436,392 | 3/1984 | Vanderwerf .......................... 353/38 |

FOREIGN PATENT DOCUMENTS 0060935  5/1980  Japan .......................... 353/DIG. 4

Primary Examiner—Harry N. Haroian
Attorney, Agent, or Firm—Donald M. Sell; James A. Smith; David W. Anderson

[57] ABSTRACT

A transmissive overhead projector includes a Fresnel lens assembly which has an f-number of about 0.25 and is capable of dioptrically focusing light at an incident angle of at least 60° with respect to a perpendicular to the Fresnel lens assembly. This refractive power of the Fresnel lens assembly allows the overhead projector light source to be positioned very close to the Fresnel lens assembly and consequently allows a significant reduction in the base height of the overhead projector.

3 Claims, 3 Drawing Sheets

REDUCED HEIGHT TRANSMISSIVE OVERHEAD PROJECTOR

BACKGROUND OF THE INVENTION

1. Field of the Invention

The present invention relates to transmissive overhead projectors.

2. Description of the Prior Art

Transmissive overhead projectors consist of a light source which directs light to, and distributes light over, a Fresnel lens assembly located just beneath a projection stage. The Fresnel lens system directs the light through a transparency located on the projection stage to a projection lens disposed above the projection stage. Light exiting the lens is then reflected by means of a mirror to a vertical screen or wall upon which a magnified image of the transparency may be viewed. It has long been a goal of overhead projector manufacturers to reduce the size of the projector, and particularly the height of the base, to increase portability.

Conventional overhead projectors which have a direct optical path, that is, an optical path not folded by mirrors, from the light source to the Fresnel lens system must have the light source positioned a significant distance from the Fresnel lens system because of the inability of the Fresnel lens system to transmit or efficiently focus light emitted from the light source at wide radiation angles. Thus the base height of such projectors must be relatively large.

Folded transmissive overhead projector systems attempt to reduce the base height of the projector as compared to direct optical path projectors by folding the light path by means of a mirror located within the projector base between the light source and the Fresnel lens system. Such projectors achieve a reduction in base height, but at a cost of an increase in the length of the base of the projector.

Several attempts have been made in the past to reduce the base height of transmissive overhead projectors for portability. In U.S. Pat. No. 3,653,754, the projection head and supporting post collapse and fold within the base for reduced height during transportation, but there is no significant reduction in the base height of the projector when in use. U.S. Pat. No. 3,770,344 describes an overhead projector which utilizes multiple coplanar Fresnel lenses and multiple light sources or multiple mirrors. U.S. Pat. No. 3,915,568 describes an overhead projector with the light source positioned closer to the projection stage by the use of a truncated conical reflector and circular-cylindric condensing lenses. U.S. Pat. No. 4,080,052 attempts to decrease the base height of an overhead projector by using a planar or curved reflector which focuses light on a bifocal Fresnel condensing lens. The above-described overhead projectors achieve some decrease in the overall base height of the overhead projector but greatly increase the complexity of the machines and the illumination systems contained therein.

SUMMARY OF THE INVENTION

The present invention provides a transmissive overhead projector which has a significantly reduced base height as compared to prior projectors without greatly increasing the complexity of the projector. The reduced base height is achieved by providing a completely dioptric Fresnel lens system which is specifically designed to have an f-number of about 0.25 for efficient refraction of marginal light rays which enter the Fresnel lens system at angles of incidence up to at least 60°. This novel Fresnel lens system allows the light source to be placed relative to the Fresnel lens system at about one-half the distance obtainable in prior art projectors.

The light source preferably includes a truncated spherical reflector which increases light intensity at oblique radiation angles to improve illumination uniformity over the Fresnel lens system.

BRIEF DESCRIPTION OF THE DRAWINGS

The present invention will be more thoroughly described with reference to the accompanying drawings, wherein like numbers refer to like parts in the several views, and wherein.

DESCRIPTION OF THE PREFERRED EMBODIMENT

Figure 1:
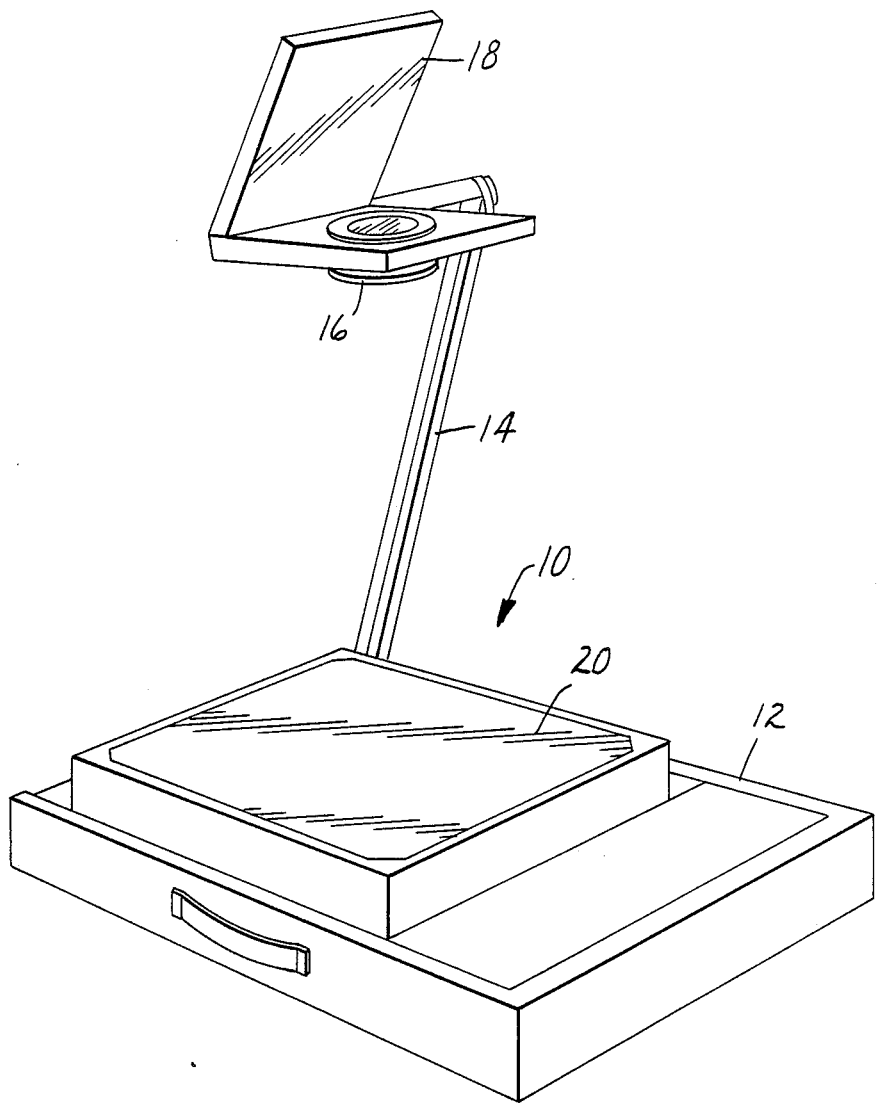
FIG. 1 is a perspective view of a transmissive overhead projector including the novel Fresnel lens system of the present invention.

FIG. 1 illustrates an overhead projector according to the present invention, generally indicated as 10, which includes a base 12, a support arm 14, a projection lens 16 and a planar mirror 18. The base 12 includes a clear glass stage 20 upon which may be positioned a transparency (not shown) of which a magnified image is to be projected. Light is directed from within the base 12, through the stage 20, focused at the projection lens 16 and reflected by the mirror 18 to a vertical projection screen or wall (not shown) upon which a magnified image of the transparency upon the stage 20 may be viewed.

Figure 2:
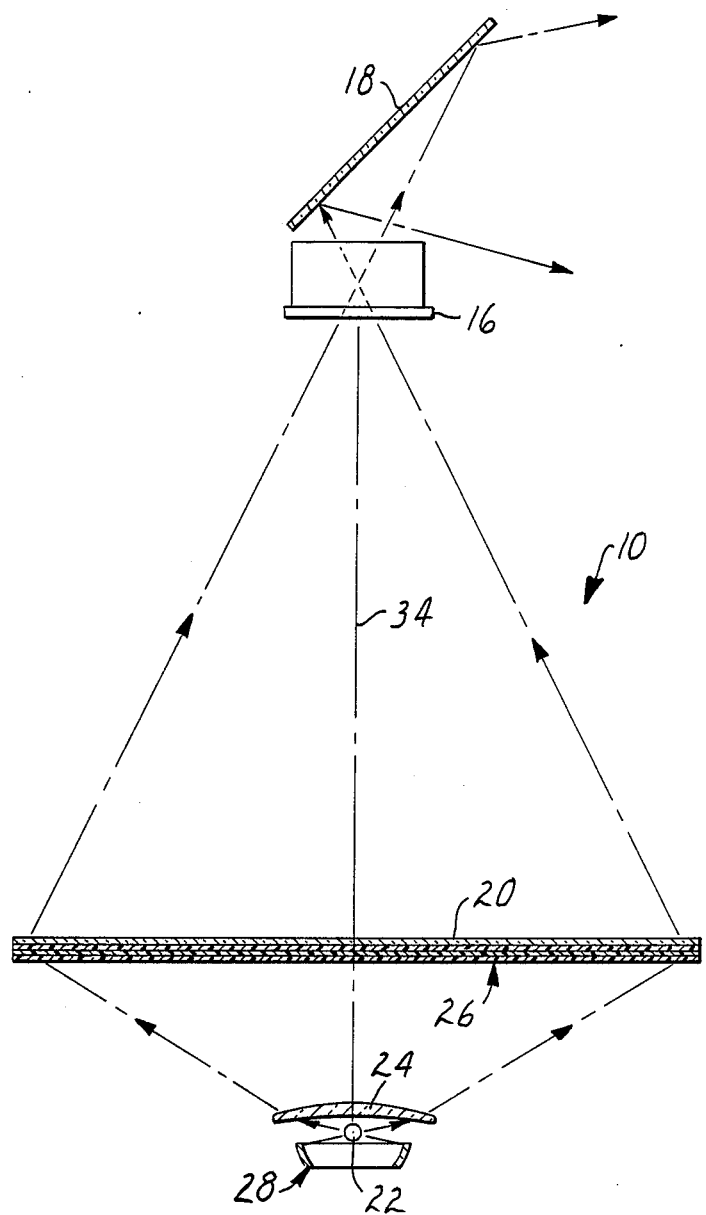
FIG. 2 is a schematic, cross-sectional view of the overhead projector of FIG. 1.

FIG. 2 is a schematic representation of the overhead projector 10 and illustrates an incandescent filament 22, preferably a tungsten filament of the commonly known "coiled-coil" type which radiates light over a wide distribution angle. Light emitted by the light source 22 is further controlled to cover the area of the stage 20 by a condensing lens 24 disposed between the filament 22 and the stage 20. The condensing lens 24 is preferably glass to resist heat generated by the filament 22. Between the glass stage 20 and the condensing lens 24 is a three-element annular Fresnel lens assembly 26 which refractively focuses light emitted to the filament 22 by the projection lens 16.

Figure 4:
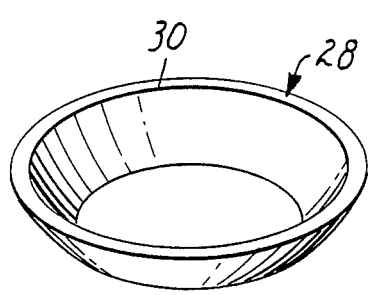
FIG. 4 is a perspective view of an annular reflector utilized in conjunction with a light source forming a portion of the present invention.
Figure 5:
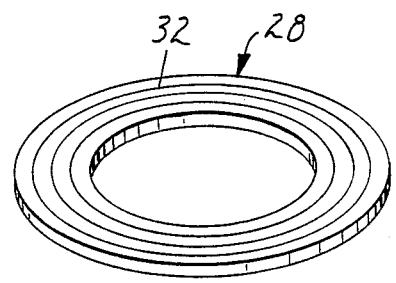
FIG. 5 is a perspective view of an alternate annular reflector used in conjunction with the light source forming a portion of the present invention.

To achieve a reduced height of the base 12 over prior projectors, the light source 22 is located much closer to the Fresnel lens assembly 26 than was previously thought possible. This results in increased illumination at the center of the Fresnel lens assembly 26, compared to the outer margins of the Fresnel lens assembly 26, due to the well-known "Cosine-fourth law". One method of increasing the light intensity at the margins of the Fresnel lens assembly 26 is by the use of an annular reflector 28, which may be a truncated sphere 30 as illustrated in FIG. 4 or an annular Fresnel 32 reflector as illustrated in FIG. 5. The center area of the annular reflector 28 is eliminated to prevent a contribution of reflected light to the central region of the Fresnel lens assembly 26.

The filament 22, the center of the annular reflector 28, the center of the condensing lens 24, the center of the Fresnel lens assembly 26, the center of the glass stage 20 and the center of the projection lens 16 all are located along a common optical axis 34. It is with respect to this optical axis 34 that the radiation angle of light emitted by the light source 22 is measured, and it will be noted from FIG. 2 that this radiation angle of light incident on the Fresnel lens assembly 26 varies from approximately 0° (along the optical axis 34) to in excess of 60°.

The key component of the overhead projector 10 which permits the use of large radiation angles, and thus permits the filament 22 to be located very close to the stage 20 with a resulting drastic reduction in the height of the base 12, is the Fresnel lens assembly 26.

Conventional transmissive two-element Fresnel lens assemblies for overhead projectors will not efficiently transmit light through the outer lens region for the reduced light source distance of the present invention. The speed of conventional two-lens assemblies cannot be made fast enough to efficiently transmit the large radiation angles of the outer, or marginal, rays. The outer portions of the projected image, therefore, appear too dark for comfortable view of the projected image. However, by designing a three-element Fresnel lens assembly, the speed can be considerably increased by controlling both the main refracting facets of all three Fresnel elements and also the riser step angles of the element closest to the filament 22. In this way, marginal rays can be efficiently transmitted and the screen will be fully illuminated.

The "speed" of a lens system is related to its f-number in that a lens system of a lesser f-number is considered to have a greater speed, i.e. be a "faster" lens system. The f-number of a lens system may be defined by the equation:

$$f\text{-number} = \frac{1}{A}\left(\frac{1}{D_1} + \frac{1}{D_2}\right)^{-1}$$

where:
A = lens system aperture
$D_1$ = distance from the light source to midpoint of the lens system
$D_2$ = distance from midpoint of the lens system to the focal point of the lens system.

In the present invention the aperture "A" is the maximum diameter of Fresnel lens assembly 26 gathering light from the filament 22, "$D_1$" is the distance from the filament 22 to the Fresnel lens assembly 26 and "$D_2$" is the distance from the Fresnel lens assembly 26 to its focal point at the projection lens 16.

Since the object of the present invention is to reduce the $D_1$ dimension and, therefore, the base height of the projector, the f-number must be reduced. The Fresnel lens assembly 26 has been designed to have an f-number of preferably about 0.25, compared to an f-number of approximately 0.50 for conventional two Fresnel lens overhead projectors. Thus the distance from the filament 22 to the Fresnel lens assembly will be one-half that of conventional projectors, with a corresponding reduction in projector base height. The Fresnel lens assembly 26 of the present invention remains fully refractive (dioptric) in its focusing properties, and does not suffer from the sharp boundary change in transmission of a catadioptric Fresnel element. The described refractive capability could be achieved by a Fresnel lens assembly 26 having more than the preferred three elements. However, each additional lens element decreases the amount of light transmitted through the lens assembly 26. It is, therefore, desirable to use the least number of lens elements which will produce the required refraction characteristics. This number has been found to be three.

Figure 3:
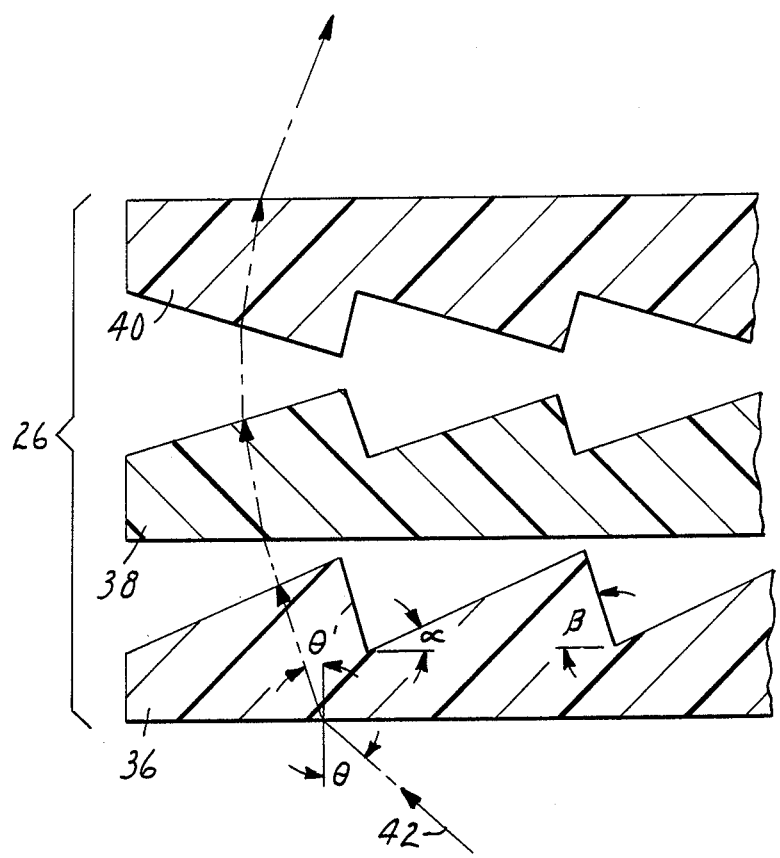
FIG. 3 is a cross-sectional view of a portion of the Fresnel lens system of the present invention.

FIG. 3 illustrates in detail a portion of the Fresnel lens assembly 26 which includes a lower annular Fresnel lens 36, an intermediate annular Fresnel lens 38 and an upper annular Fresnel lens 40. "Upper" and "lower" refers to proximity of the Fresnel lens to the projection lens 16 and the filament 22, respectively. FIG. 3 also illustrates a marginal light ray 42 from the filament 22 which impinges upon the lower Fresnel lens 36 at an angle of incidence of $\theta$, which angle $\theta$ is equal to the radiation angle of the light ray 42 from the optical axis 34. As stated above, the angle of light rays 42 at the margins of the Fresnel lens assembly 26 is preferably approximately 60°, although this angle may be larger if a further reduction in base height is desired. FIG. 3 further illustrates an angle $\theta'$ which is the angle of refraction on the lower Fresnel element 36, an angle $\alpha$ which is the groove angle of each Fresnel element 36, 38 and 40, and an angle $\beta$ which is the riser step angle of the Fresnel elements 36, 38 and 40.

The groove angles $\alpha$ of each Fresnel element 36, 38 and 40 are described by the following equation, derived from the sag equation of a general aspheric surface:

$$\text{Tangent }(\alpha) = \frac{2YC}{1 + \sqrt{1 - (K+1)C^2Y^2}} + \frac{(K+1)C^3Y^3}{\sqrt{1 - (K+1)C^2Y^2}\,[1 + \sqrt{1 - (K+1)C^2Y^2}\,]^2} + 4dY^3 + 6eY^5 + 8fY^7 + 10gY^9 \quad (1)$$

where:
Y = distance of groove center to lens center
C = vertex curvature
K = conic constant
d, e, f, g aspheric deformation coefficients.

The groove frequency of the three Fresnel elements 36, 38 and 40 have a value of about two to eight grooves per millimeter and are preferably manufactured of acrylic optical plastic.

In addition to controlling the groove angles $\alpha$, the riser steps angles, $\beta$, of the lower Fresnel element 36 are controlled such that the risers remain parallel to the internally refracted ray 42, to minimize riser step blockage. These riser angles $\beta$ are defined by the following series of equations:

$$\theta = \text{ARCTANGENT }(Y/D) \quad (2)$$

$$\theta' = \text{ARCSINE }(\text{SINE}(\theta)/R) \quad (3)$$

$$\beta = \Pi/2 - \theta' \quad (4)$$

where:
$\theta$ = angle from vertical of incidence on lower Fresnel element $\theta'$ = angle from vertical of refraction on lower Fresnel element
$\beta$ = riser step angle
Y = distance of groove from lens center
D = distance of light source to lower Fresnel element
R = refractive index of Fresnel lens material.

The projection lens 16 is preferably of the variable focus type, in which image magnification changes are achieved by changing the focal length of the lens. The advantage to using this type of projection lens is that there is negligible movement of the projection lens over the focus range. Thus, the usual requirement of filament 22 movement to compensate for the movement of a fixed focus projection lens over its magnification range is eliminated. The light source then can remain fixed in its closest position to the Fresnel lens assembly 26, keeping the height of the base 12 to a minimum.

EXAMPLE

In a specific example of an overhead projector 10 utilizing the principles of the present invention, the distance of the filament 22 from the three-element Fresnel lens assembly 26 is 97 mm. The glass condenser lens 24 has a focal length of 275 mm. The reflector 28 is spherical with a radius of curvature of 23.9 mm and has an upper diameter of 44 mm and a lower diameter of 32 mm. The center of the spherical reflector 28 is located 23.9 mm below the filament 22. The Fresnel lens assembly 26 has a combined focal length of 79.82 mm and operates at an f-number of f/0.23. The lower Fresnel element 36 has the following design parameters describing the main refracting facets:

C = 0.014402 mm$^{-1}$
K = −1.09315
d = −2.8876E−8
e = −8.8564E−13
f = 1.7153E−17
g = −1.934E−23

The riser step angles $\beta$ for the lower Fresnel element 36 are controlled to vary from 89.9° near the center of the element 36 to 53.9° near the lens corner.

Element 38 has the following design parameters describing the main refracting facets:

C = 0.005869 mm$^{-1}$
K = −0.96968
d = 2.4298E−9
e = −1.1048E−14
f = 3.2017E−20
g = −9.1357E−26

Element 40 has the following design parameters describing the main refracting facets:

C = 0.005353 mm$^{-1}$
K = −1.05619
d = 1.4593E−9
e = 9.1537E−16
f = −1.9632E−20
g = 9.3543E−26

The grooved surfaces of the lower Fresnel element 36 and the intermediate Fresnel element 38 both face upwardly, i.e. toward the projection lens 16 and away from the filament 22, while the upper Fresnel lens element 40 has a grooved surface which faces downwardly, i.e. toward the filament 22 and away from the projection lens 16. The entire Fresnel lens assembly 26 is preferably sealed at its edges to protect the grooved surfaces. All Fresnel elements 36, 38 and 40 are manufactured in two millimeter thick optical acrylic plastic, having a refractive index of 1.491 for yellow light.

The variable focal length projection lens has a focal length range of 280 mm to 315 mm and an f-number of f/6.5. The projection lens 16 can project images over the magnification range of 3.1× to 9.8× at a nominal height above the stage 20 of 378 mm.

I claim:
1. A reduced height transmissive overhead projector comprising:
a light capable of emitting light in a cone;
a projection lens; and
a Fresnel lens assembly of three coaxial annular elements centered over said light source and capable of focusing light emitted from said light source to a focus at said projection lens and having an f-number of less than 0.50 wherein f-number is defined as the reciprocal of the maximum diameter of said Fresnel lens assembly gathering light emitted by said light source divided by the sum of the reciprocal of the distance from the midpoint of said Fresnel lens assembly to said light source and the reciprocal of the distance from said midpoint of said Fresnel lens assembly to said focus at said projection lens, and wherein said Fresnel lens elements are disposed such that the grooved surface of the Fresnel lens element nearest the light source faces away from said light source, the grooved surface of the Fresnel lens element nearest the projection lens faces away from said projection lens, and wherein the grooved surface of the intermediate Fresnel lens element faces away from said light source, wherein the angles of said grooved surfaces are described by the equation:

$$\text{Tangent}(\alpha) = \frac{2YC}{1 + \sqrt{1 - (K+1)C^2Y^2}} + \frac{(K+1)C^3Y^3}{\sqrt{1-(K+1)C^2Y^2}\,[1+\sqrt{1-(K+1)C^2Y^2}\,]^2} + 4dY^3 + 6eY^5 + 8fY^7 + 10gY^9 \quad (1)$$

where:
Y = distance of groove center to lens center
C = vertex curvature
K = conic constant
d, e, f, g = aspheric deformation coefficients.
and wherein the grooved surface of the Fresnel lens element nearest the light source has the following parameters:
C = 0.014402 mm$^{-1}$
K = −1.09315
d = −2.8876E−8
e = −8.8564E−13
f = 1.7153−17
g = −1.934E−23
wherein the grooved surface of the Fresnel lens element nearest the projection lens has the following parameters:
C = 0.005353 mm$^{-1}$
K = −1.05619
d = 1.4593E−9
e = −1.9632E−20
g = 9.3543E−26
and wherein said grooved surface of said intermediate Fresnel lens has the following parameters:
C = 0.005869 mm$^{-1}$
K = −0.96968
d = 2.4298E−9

$e = -1.1048E-14$
$f = 3.2017E-20$
$g = -9.1357E-26$.

2. A reduced height overhead projector according to claim 1 wherein said light source includes an incandescent filament and an annular reflector disposed opposite said Fresnel lens assembly with respect to said filament for selectively reflecting light emitted by said filament to said margins of said Fresnel lens element nearest said light source.

3. A reduced height overhead projector according to claim 1 wherein said annular relector is a truncated spherical reflector.

* * * * *

UNITED STATES PATENT AND TRADEMARK OFFICE
CERTIFICATE OF CORRECTION

PATENT NO. : 4,741,613

DATED : May 3, 1988

INVENTOR(S) : Dennis F. Vanderwerf

It is certified that error appears in the above-identified patent and that said Letters Patent is hereby corrected as shown below:

Column 3, line 29, "view" should read --viewing--.

Column 4, line 48, "g aspheric" should read --g = aspheric--.

Column 6, line 55, "f=1.7153-17" should read --f=1.7153E-17--.

Column 6, line 63, "e=1.9632E-20 should read --e=9.1537E-16--.

Column 6, line 64, insert --f=-1.9632E-20-- before "g=9.3543E-26".

Signed and Sealed this

Eighth Day of November, 1988

*Attest:*

DONALD J. QUIGG

*Attesting Officer*  *Commissioner of Patents and Trademarks*